United States Patent
Dunbar et al.

(10) Patent No.: US 8,018,843 B2
(45) Date of Patent: Sep. 13, 2011

(54) FAULTS PROPAGATION AND PROTECTION FOR CONNECTION ORIENTED DATA PATHS IN PACKET NETWORKS

(75) Inventors: Linda Dunbar, Plano, TX (US); Lucy Yong, Plano, TX (US); Steve Yao, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 680 days.

(21) Appl. No.: 11/554,367

(22) Filed: Oct. 30, 2006

(65) Prior Publication Data

US 2008/0068983 A1 Mar. 20, 2008

Related U.S. Application Data

(60) Provisional application No. 60/826,196, filed on Sep. 19, 2006.

(51) Int. Cl.
*H04L 12/26* (2006.01)
(52) U.S. Cl. ........................... 370/225; 370/248
(58) Field of Classification Search .................. None
See application file for complete search history.

(56) References Cited

U.S. PATENT DOCUMENTS

| | | | | |
|---|---|---|---|---|
| 5,559,955 A * | 9/1996 | Dev et al. | | 714/4 |
| 6,091,720 A * | 7/2000 | Bedard et al. | | 370/351 |
| 6,421,434 B1 * | 7/2002 | Rosu | | 379/133 |
| 6,473,815 B1 * | 10/2002 | Lu et al. | | 710/52 |
| 7,043,250 B1 | 5/2006 | DeMartino | | |
| 7,058,008 B1 * | 6/2006 | Wilson et al. | | 370/216 |
| 7,420,962 B2 * | 9/2008 | Das et al. | | 370/352 |
| 7,715,837 B2 * | 5/2010 | Lehtovirta et al. | | 455/424 |
| 2002/0004843 A1 | 1/2002 | Andersson et al. | | |
| 2003/0123393 A1 * | 7/2003 | Feuerstraeter et al. | | 370/235 |
| 2003/0169692 A1 | 9/2003 | Stern et al. | | |
| 2004/0004937 A1 | 1/2004 | Skalecki et al. | | |
| 2005/0047579 A1 * | 3/2005 | Salame | | 379/265.09 |
| 2005/0169280 A1 * | 8/2005 | Hermsmeyer et al. | | 370/395.51 |
| 2006/0039371 A1 | 2/2006 | Castro et al. | | |

(Continued)

FOREIGN PATENT DOCUMENTS

CN 1267442 9/2000

(Continued)

OTHER PUBLICATIONS

Foreign communication from a counterpart application—International Search Report and Written Opinion, PCT/CN2007/070721, Dec. 20, 2007, 9 pgs.

(Continued)

*Primary Examiner* — Kwang B Yao
*Assistant Examiner* — Alex Skripnikov
(74) *Attorney, Agent, or Firm* — Conley Rose, P.C.; Grant Rodolph

(57) ABSTRACT

A communications network comprising components configured to implement a method comprising analyzing a path between a first end point and a second end point, and identifying a partial fault along the path is disclosed. Also disclosed is a method for communicating information within a network, the method comprising: defining a path traversing a plurality of nodes, receiving a fault report from an intermediate node, determining whether the fault report affects the path, and responsive to the determination that the fault report affects the path, transmitting the fault report to an upstream or downstream node in the path.

22 Claims, 9 Drawing Sheets

U.S. PATENT DOCUMENTS

| | | | |
|---|---|---|---|
| 2007/0036181 A1* | 2/2007 | Nagasawa | 370/536 |
| 2007/0047453 A1 | 3/2007 | Bender et al. | |
| 2007/0110079 A1 | 5/2007 | Schollmeier et al. | |

FOREIGN PATENT DOCUMENTS

| | | |
|---|---|---|
| CN | 1830184 | 9/2006 |
| EP | 1324537 A2 | 7/2003 |
| WO | 9859521 A1 | 12/1998 |
| WO | 0016113 | 3/2000 |
| WO | 2006060491 A2 | 6/2006 |

OTHER PUBLICATIONS

International Telecommunication Union, Telecommunication Standardization Sector of ITU, G.8110/Y.1370; "MPLS Layer Network Architecture"; 72 pgs.; Jan. 2005.

Foreign Communication From a Related Counterpart Application—Supplementary European Search Report, EP 07801115, Nov. 8, 2008, 7 pages.

Foreign communication from a counterpart application, Chinese application 200780032831.5, Office Action dated Aug. 4, 2010, 6 pages.

Foreign communication from a counterpart application, Chinese application 200780032831.5, Partial English Translation of Office Action dated Aug. 4, 2010, 6 pages.

Foreign Communication from a counterpart application, EPO application 07801115.2, Office Action dated May 4, 2009, 4 pages.

"IEEE Standard for Local and Metropolitan Area Networks—Virtual Bridged Local Area Networks Amendment 5: Connectivity Fault Management," IEEE Std 802.1ag, Dec. 17, 2007.

\* cited by examiner

FAULTS PROPAGATION AND PROTECTION FOR CONNECTION ORIENTED DATA PATHS IN PACKET NETWORKS

CROSS-REFERENCE TO RELATED APPLICATIONS

The present application claims priority to U.S. provisional patent application Ser. No. 60/826,196, filed Sep. 19, 2006 and hereby incorporated by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are comprised of nodes that transport data through the network. The nodes include routers and/or switches that select paths for the individual data packets to travel through the network. When large amounts of data are to be transported from a common source, A, to a common destination, Z, a data path can be established from A to Z and all the data to be transported from A to Z can be mapped to this path. By doing so, the nodes in the path no longer need to determine the path to transport the data packets. Instead the nodes merely transport the data to the next node in the path, which significantly improves the efficiency of data transportation. The data is then transported from node to node through the network until the data arrives at the destination node.

Unfortunately, the nodes and their physical connections sometimes suffer from faults. Examples of these faults include physical link breaks and router failures. The faults degrade system performance by dropping the data as it is transported through the network. Even if the fault does not cause the data to be dropped, the fault can create an unacceptable decrease in network performance. Specifically, some faults may make a node appear to be operating normally when, in fact, the node only has a fraction of its normal capacity. Thus, an improved system for identifying and responding to network faults is needed.

SUMMARY

In one aspect, the invention includes a communications network comprising components configured to implement a method comprising analyzing a path between a first end point and a second end point, and identifying a partial fault along the path.

In another aspect, the invention includes a method for communicating information within a network, the method comprising: defining a path traversing a plurality of nodes, receiving a fault report from a downstream node, determining whether the fault report affects the path, and responsive to the determination that the fault report affects the path, transmitting the fault report to an upstream node in the path.

In a third aspect, the invention includes a communications system comprising a first path end point and a second path end point, a network in communication with the first path end point and the second path end point, the network comprising a plurality of working paths that transport data between the first path end point and the second path end point, a protection path configured to transport data between the first path end point and the second path end point, wherein the network determines whether any of the working paths are affected by a fault, and responsive to the determination that one of the working paths is affected by the fault, the network transfers at least some of the data from the affected working path to the protection path.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is described below, the present system may be implemented using any number of techniques, whether currently known or in existence. The present disclosure should in no way be limited to the illustrative implementations, drawings, and techniques described below, including the exemplary design and implementation illustrated and described herein, but may be modified within the scope of the appended claims along with their full scope of equivalents.

Disclosed herein is a network configuration that allows a network to identify, report, and respond to faults that occur within a communications network. Specifically, the network comprises a plurality of working paths, a protection path, and a method for identifying faults in the working paths and the protection path. The faults may include partial faults in which connectivity is maintained but capacity is diminished. When a fault is identified by a network node, the node consolidates its fault report with the fault reports it receives from the downstream nodes, thereby producing a consolidated fault report. The node then transmits the consolidated fault report to any upstream nodes that are affected by the fault. When the source node receives the consolidated fault report, the network uses the consolidated fault report to modify the data streams on the working paths and optionally transfer some of the data streams onto the protection path. The present network configuration is advantageous because it allows the network to provide measured, timely responses to network faults, thereby reducing network congestion and packet drop rates compared to previous network configurations.

Figure 1:
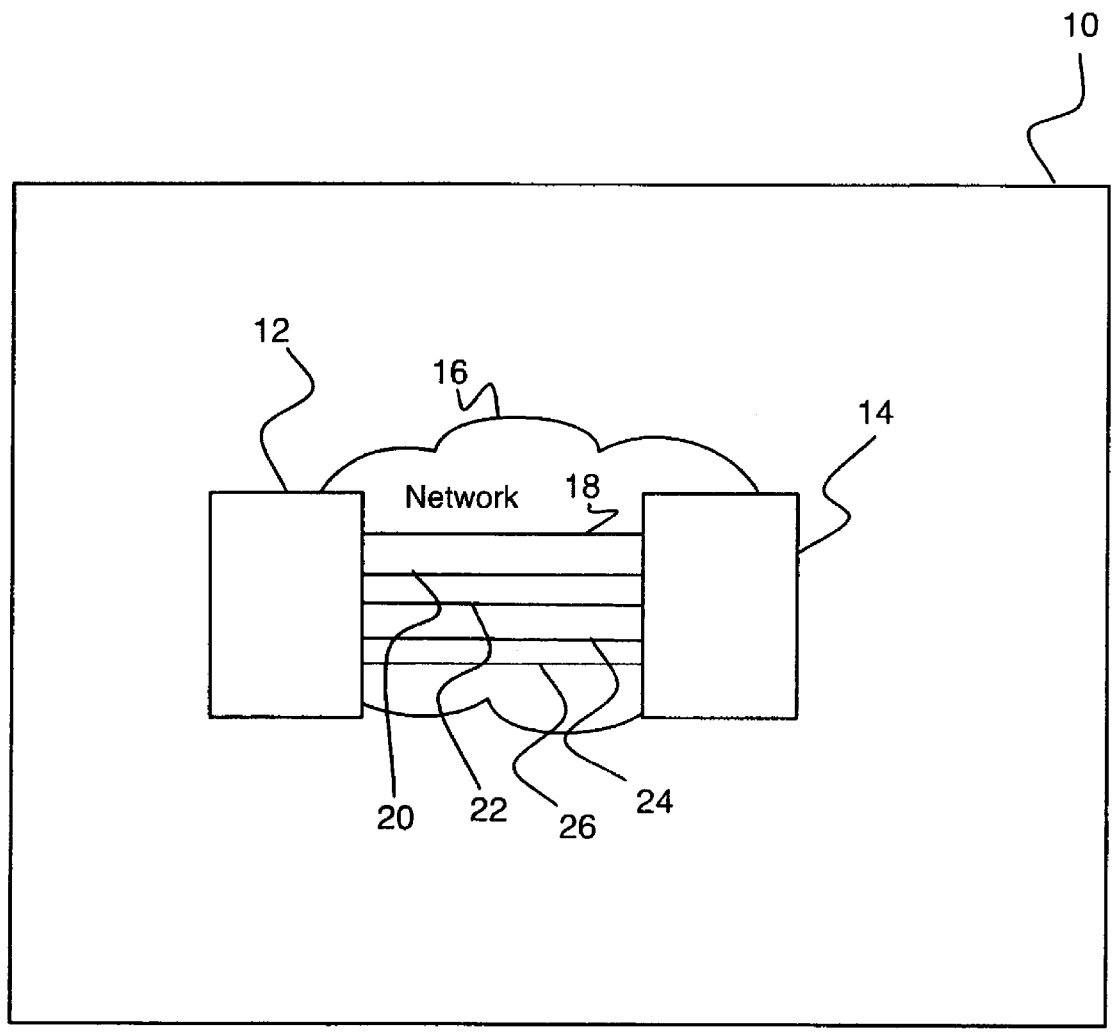
FIG. 1 is an illustration of one embodiment of a communications network.

FIG. 1 illustrates one embodiment of a system 10 for transporting data from one location to another location. The system 10 comprises a first path end point 12, a second path end point 14, a network 16, a first working path 18, a second working path 20, a third working path 22, a fourth working path 24, and a protection path 26 from the path end point 12 to the path end point 14. It should be recognized that while FIG. 1 illustrates a network 16 with only one protection path 26 and four working paths 18, 20, 22, and 24, it is contemplated that the network 16 may contain any number of working paths and protection paths. Similarly, the network 16 is not limited to two path end points 12, 14, but instead can accommodate any number of path end points 12, 14. Generally, path end points 12, 14 may exchange data with each other via at least one of the working paths 18, 20, 22, 24 in the network 16. As explained in detail below, when a problem, such as a fault, occurs in one or more of the working paths 18, 20, 22, 24, a fault report is propagated through the network 16 to the path end points 12 or 14 so that the path end point 12 or 14 can redirect the data streams from the working paths 18, 20, 22, 24 to the protection path 26.

In an embodiment, the path end points 12, 14 are any device, component, or network 16 that may produce and/or receive data. The path end points 12, 14 may be path end point-oriented wire-line networks or nodes, such as Digital Subscriber Line (DSL) connections, provider network edge devices, or IEEE 802 networks, or path end point-oriented wireless networks, such as a cellular network. Alternatively, the path end points 12, 14 may be fixed or mobile user-oriented devices, such as desktop computers, notebook computers, personal digital assistants (PDAs), or cellular telephones. The path end points 12, 14 may produce and/or receive data streams, or merely pass the received data onto a provider network. The path end points 12, 14 may be either a source or a destination as those terms are used herein.

In an embodiment, the network 16 is any communication system that may be used to transport data between path end points 12, 14. Specifically, the network 16 may be any network within which capacity and/or a connection path may be reserved. In an embodiment, the network 16 may include a Packet Switched Network (PSN) that transports IP traffic between the path end point 12 and the path end point 14. In another embodiment, the network could be connection oriented Ethernet or T-MPLS transport network that transports a data stream or a pseudo wire between path end point 12 and path end point 14. For example, the network 16 may transfer data packets between DSL Access Multiplexers (DSLAMs), Radio Network Controllers (RNCs), and/or Internet Protocol/Multi-Protocol Packet Label Switching (IP/MPLS) networks. The network 16 and the path end points 12, 14 may both be networks with different administrative domains, different transport technologies, or even different providers. For example, the path end points 12, 14 may be Ethernet networks and the network 16 may be an IP network. Alternatively, the network 16 may be any other type of data transport network known to persons of ordinary skill in the art.

In an embodiment, the working paths 18, 20, 22, 24 are devices or networks that transport data between a plurality of path end points. The working paths 18, 20, 22, 24 may be physical, virtual, and/or wireless connections that traverse at least part of the network 16. More specifically, each of the working paths 18, 20, 22, 24 may connect a single port on the path end point 12 with a single port on the path end point 14. Between these path end point ports, the working paths 18, 20, 22, 24 may comprise a plurality of nodes, such as routers or switches, and a plurality of links, such as wires or fiber optics. The nodes and link may have different properties, such as physical structure, capacity, transmission speed, and so forth. In some embodiments, the links may comprise an aggregated link. For example, the link between two routers may be a fiber optic bundle that contains a plurality of individual fiber optic lines. The structure of the aggregated links is described in more detail below.

In an embodiment, the protection path 26 is a device or network that is configured to transport data between a plurality of end to end paths. The protection path 26 generally has all of the same properties as the working paths 18, 20, 22, 24 described above. However, the protection path 26 may be distinguished from the working paths 18, 20, 22, 24 in that the protection path 26 is configured to accept data streams from a wider variety of path end point ports than the working paths 18, 20, 22, 24. For example, when there are no faults within the network 16, the working paths 18, 20, 22, 24 may be sufficient to transport data between the path end points 12, 14 and the protection path 26 may not transport any data between the path end points 12, 14. However, when a fault is encountered in one of the working paths 18, 20, 22, 24, at least some of the data from any one of the working paths 18, 20, 22, 24 may be rerouted to the protection path 26. In another embodiment, the protection path 26 may be used to transport data between the path end points 12, 14. In such an embodiment, the protection path 26 fulfills all the aforementioned functions of the working path.

Figure 2:
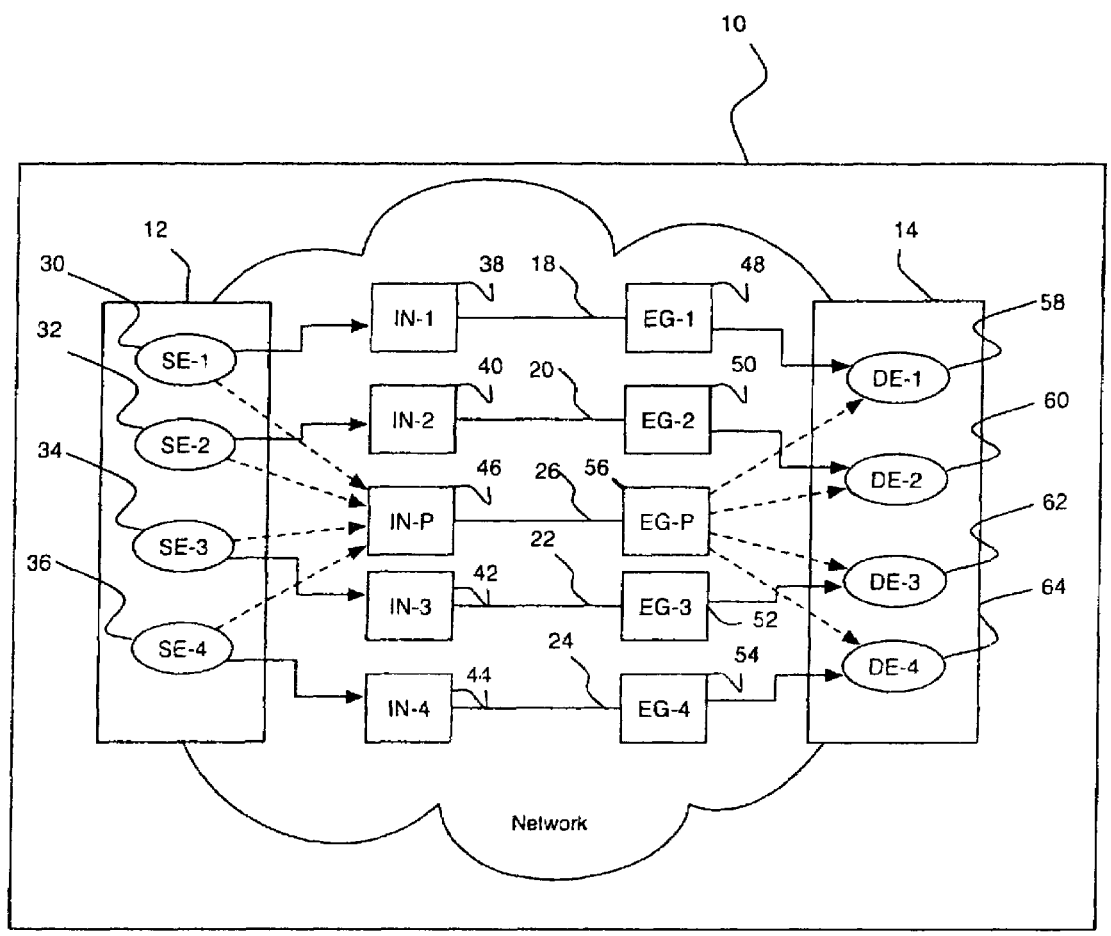
FIG. 2 is an illustration of another embodiment of a communications network.

FIG. 2 illustrates a system 10 in which one protection path 26 may transport data to and from a plurality of end to end paths. Specifically, path end point 12 contains a first source port 30, a second source port 32, a third source port 34, and a fourth source port 36. Similarly, path end point 14 contains a first destination port 58, a second destination port 60, a third destination port 62, and a fourth destination port 64. Also, the network 16 contains two first working path nodes 38, 48, two second working path nodes 40, 50, two third working path nodes 42, 52, two fourth working path nodes 44, 54, and two protection path nodes 46, 56. The nodes 38, 40, 42, 44, may serve as ingress nodes for the ports the 30, 32, 34, 36, respectively. Likewise, the nodes 48, 50, 52, 54 may serve as egress nodes for the ports 58, 60, 62, 64, respectively. As indicated by the dashed arrows in FIG. 2, node 46 may serve as an ingress node for the ports 30, 32, 34, 36, and the node 56 may serve as an egress node for the ports 58, 60, 62, 64. Thus, when any one of the working paths 18, 20, 22, 24 has a fault, some or all of the data from the working paths 18, 20, 22, 24 may be transferred to the protection path 26.

The capacity of the protection path 26 may differ from the capacity of the working paths 18, 20, 22, 24. In an embodiment, the capacity of the protection path 26 may be less than the sum of the capacities for the working paths 18, 20, 22, 24. For example, assume that the working path 18 has a capacity of 100 megabits per second (Mbps), the working path 20 has a capacity of 300 Mbps, the working path 22 has a capacity of 50 Mbps, and the working path 24 has a capacity of 400 Mbps. In such a case, the total capacity of the working paths 18, 20, 22, 24 is 850 Mbps, but the protection path 26 may be configured with a capacity of 500 Mbps. Even though the capacity of the protection path 26 is less than the total capacity of the working paths 18, 20, 22, 24, the capacity of the protection path 26 is sufficient to protect the working paths 18, 20, 22, 24 because the working paths 18, 20, 22, 24 may not completely lose their transport capacity, e.g. due to a partial fault, and/or not all of the working paths 18, 20, 22, 24 will fail at the same time. In addition, even if one of the working paths 18, 20, 22, 24 completely fails, the capacity of the protection path 26 is sufficient to accommodate any one of the working paths 18, 20, 22, 24. In another embodiment, the capacity of the protection path 26 may be less than any one of the working paths 18, 20, 22, 24. When working path 18 fails, only part of data on working path 18 is switched to the protection path 26. So the protection path 26 can be provisioned with smaller capacity than the working paths 18, 20, 22, 24. It is also envisioned that the capacity of the protection path 26 may be more than the capacity of the working paths 18, 20, 22, 24.

Figure 3:
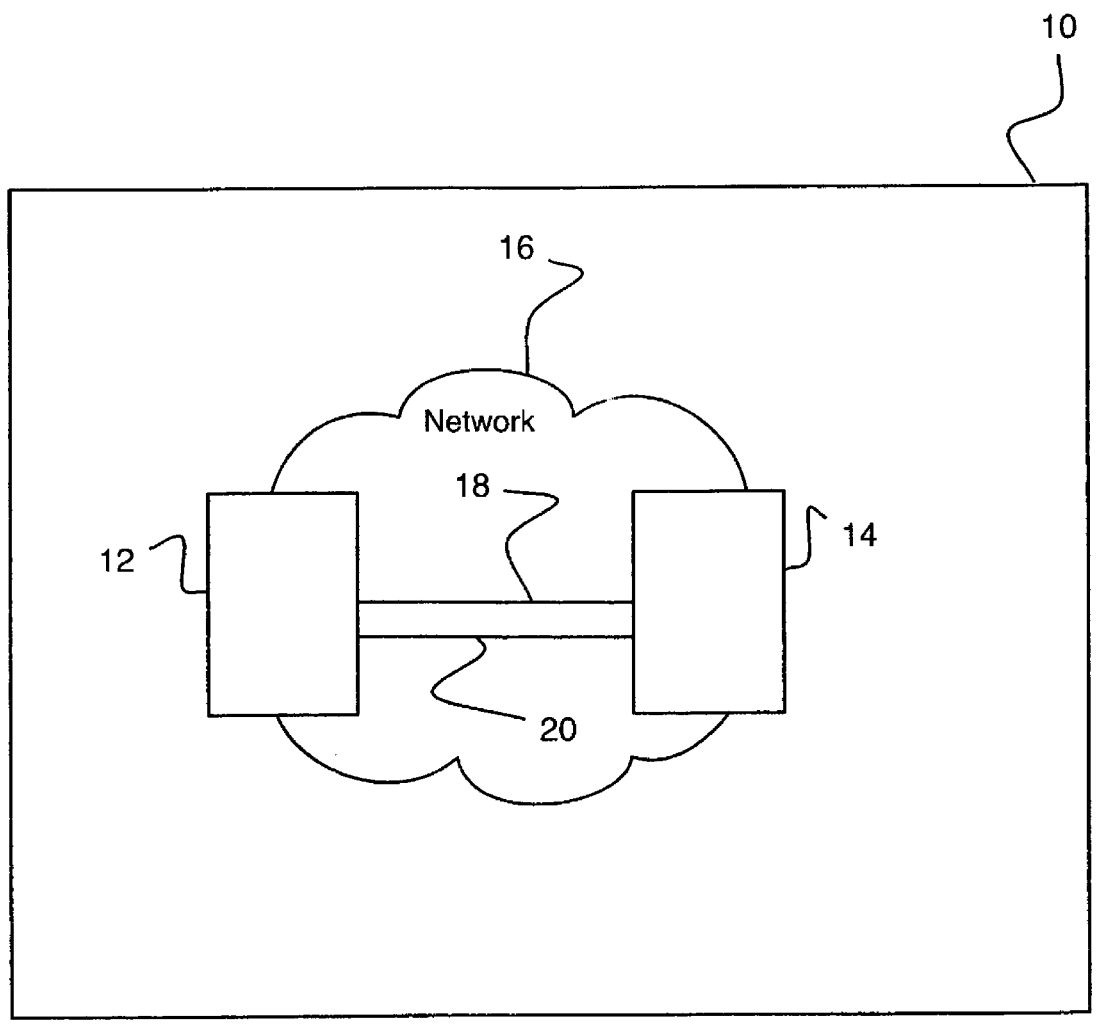
FIG. 3 is an illustration of another embodiment of a communications network.

FIG. 3 illustrates a system 10 in which the working path serves as the protection path. Specifically, the system 10 contains a network 16 with two working paths 18, 20 that transport data between the path end points 12, 14. The working paths 18, 20 may be divided into a primary working path and a secondary working path. A policy may dictate how data is transferred between the primary working path and the secondary working path such that the primary working path is used at or near capacity and the secondary working path is configured with excess capacity. When a fault is detected on the primary working path, the network 16 analyzes the impact of the fault and reconfigures at least part of the data stream to the secondary working path. Thus, the secondary working path acts as a protection path for the primary working path.

As an example, working path 18 may be a primary working path and working path 20 may be a secondary working path. The policy may state that 60 percent of the data traffic is transported on the primary working path and 40 percent of the data traffic is transported on the secondary working path. If a partial fault occurs on the primary working path and reduces the primary working path capacity by 50 percent, then the network may reconfigure the data stream so that 30 percent (60 percent times 50 percent) of the data stream is transported on the primary route and 70 percent (the remaining) of the data stream is transported on the secondary route. In such an example, the secondary working path 20 acts as a protection path for the primary working path 18.

Figure 4:
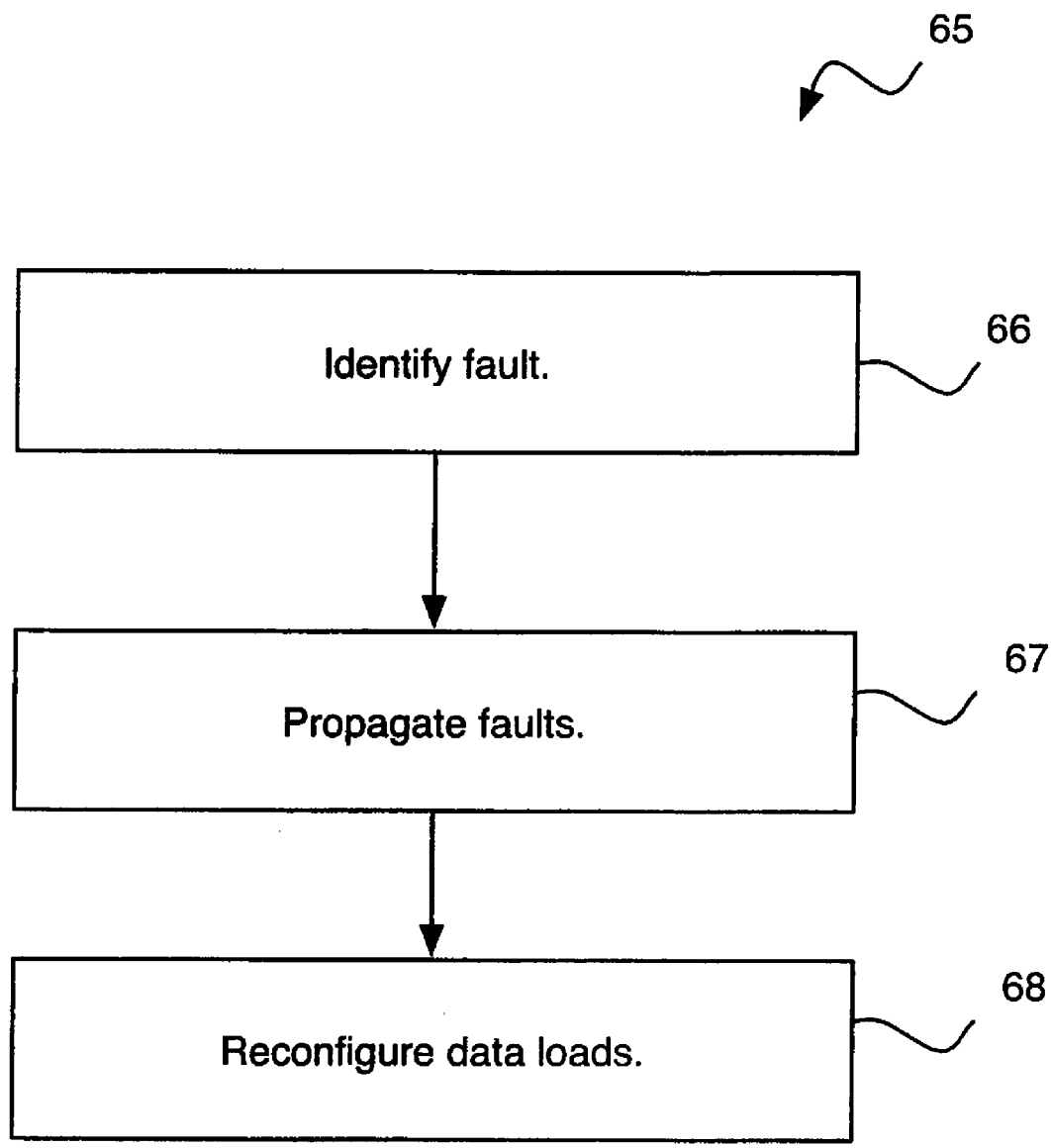
FIG. 4 is a flowchart of one embodiment of a fault reporting method.

FIG. 4 illustrates one embodiment of a method 65 for reporting faults in a communications network. The method 65 begins by identifying a fault (block 66), which may include a partial fault. The method 65 continues by propagating the fault to the upstream nodes (block 67). When the fault is received at the upstream node, the network reconfigures the data streams over the working paths (block 68). Each of these blocks is discussed in further detail below.

Referring generally to FIGS. 1, 2, 3, and 4, the network 16 may identify faults in its working paths or the protection path (block 66). As used herein, the term "fault" refers to any condition that affects the connectivity or capacity of a working path, a protection path, a node, or a link within the network. Faults and partial faults may occur in networks for a variety of reasons, including damage to the network, congestion, and so forth. In some embodiments, the fault may be a partial fault, which refers to a fault in which connectivity is maintained but capacity is affected. If a link, node, working path, or protection path is associated with a reserved connection that has a reserved capacity, such as a pseudo-wire, the partial faults may result in the link, node, working path, or protection path not being able to transport data at the reserved capacity.

In an embodiment, partial faults may be identified by a change in the packet drop rate. Specifically, the network 16 may monitor the packet drop rate of any working path, protection path, node, or link for comparison against a threshold value. Packet drop rates may fluctuate occasionally, but a sustained increase in packet drop rate may indicate a partial fault in the affected node or link. Thus, the network 16 may use a packet drop rate over a predetermined period of time as one of the events that triggers the data stream reconfiguration described herein. Packet drop rates may be caused by a variety of factors, including buffer overflow and packet loss. Persons of ordinary skill in the art are aware of other factors that affect packet drop rates.

In an embodiment, the partial failure may be an oversubscription to a node or link. Oversubscription occurs when the subscription rate on a node or link is near, at, or exceeds the capacity of the node or link. Unlike temporary burst traffic, the packet drop caused by oversubscription can last for long periods of time. Oversubscription causes congestion within the node or link, which results in the node or link dropping some of the data packets. Oversubscription can occur even if the traffic for a node or link is less than its reserved capacity.

In an embodiment, the partial failure may be the failure of a sub-link in an aggregated link. In a packet network, a link may be a logical entity composed of multiple physical links. Such an embodiment is defined by Institute for Electrical and Electronics Engineers (IEEE) 802.3ad. The physical links may be aggregated in such a way that they appear to be a single physical connection. While an aggregated link appears to be a single physical connection, the aggregated link has failure properties different from those of a single physical connection. More specifically, a single physical connection is generally described as being in a fully operational state when the single physical connection is in an "up" or connected state. Likewise, the single physical connection may generally be described as being in a non-operational state when the single physical connection is in a "down" or disconnected state, which may include degraded service states. While an aggregated link may be fully up or fully down, the aggregated link may also exist in one of several partially up or partially down states. When the capacities of each of the sub-links are equal, the percentage that the link is up may be defined by formula (1):

$$\text{Percent up} = \frac{(\text{The number of the sub-links that are up}) \times 100}{(\text{The total number of the sub-links})} \quad (1)$$

In some embodiments, the capacities of the sub-links may not all be equal. In such an embodiment, the percentage that the link or node is up may be defined by formula (2):

$$\text{Percent up} = \frac{(\text{The sum of the capacities of the sub-links that are up}) \times 100}{(\text{The total capacity of all the sub-links})} \quad (2)$$

In other embodiments, it may be more useful to describe the extent to which a link is up in terms of the amount of reserved capacity that passes through the node or link. In such an embodiment, the percentage that the link or node is up may be defined by formula (3):

$$\text{Percent up} = \frac{(\text{The sum of the capacities of the sub-links that are up}) \times 100}{(\text{The total reserved capacity of the link})} \quad (3)$$

Thus, the network can use formulas (1), (2), and (3) to report partial faults that occur within aggregated links within the network.

Figure 5:
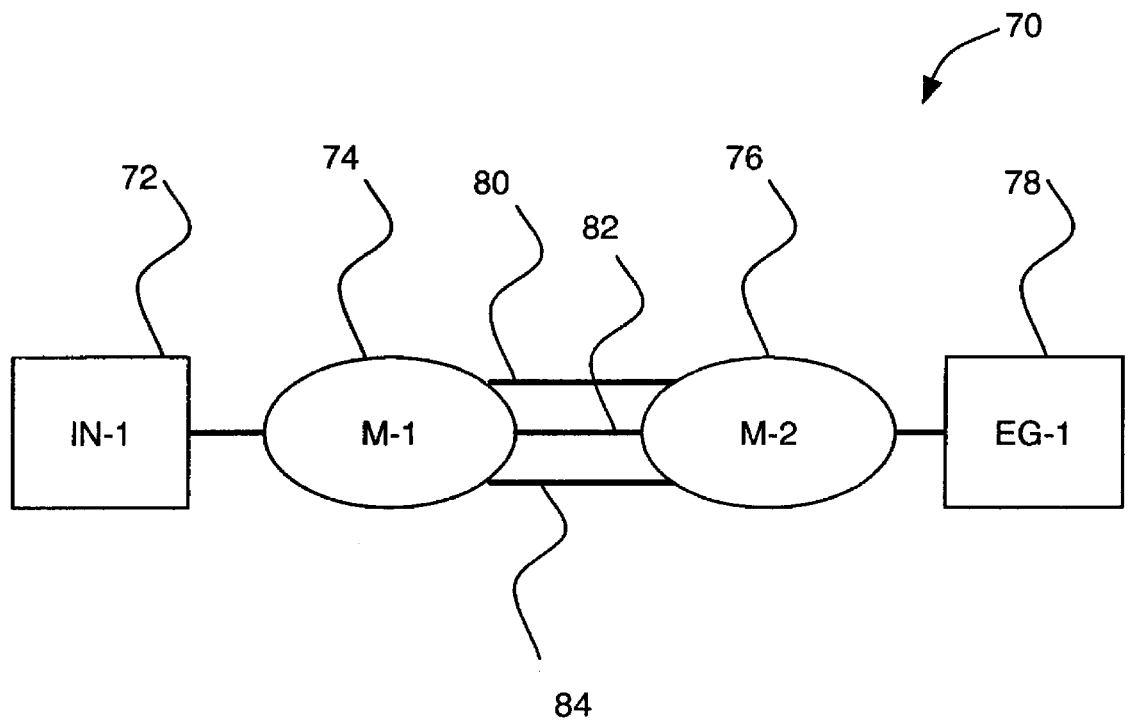
FIG. 5 is an illustration of a multiple link.

FIG. 5 illustrates a simple working path 70 that may be used to illustrate a partial failure in an aggregated link. The working path 70 comprises an ingress node 72, two intermediate nodes 74, 76, and an egress node 78. The intermediate nodes 74, 76 are connected by an aggregated link comprising a first sub-link 80, a second sub-link 82, and a third sub-link 84. In a first example, all three sub-links 80, 82, 84 may all have the same capacity of 40 Mbps, for a total link capacity of 120 Mbps. If the third sub-link 84 fails, then the extent to which the link is up may be defined by formula (1):

$$\text{Percent up} = \frac{(2) \times 100}{(3)} = 67\% \quad (1)$$

Thus, when the third link fails, the intermediate nodes 74, 76 may report the link as being 67 percent up.

In a second example, the capacity of the first sub-link 80 may be 20 Mbps, the capacity of the second sub-link 82 may be 40 Mbps, and the capacity of the third sub-link 84 may be 60 Mbps, for a total link capacity of 120 Mbps. In this example, if the third sub-link 84 fails, then the extent to which the link is up may be defined by formula (2):

$$\text{Percent up} = \frac{(20 \text{ Mbps} + 40 \text{ Mbps}) \times 100}{(20 \text{ Mbps} + 40 \text{ Mbps} + 60 \text{ Mbps})} \quad (2)$$

$$= \frac{6000 \text{ Mbps}}{120 \text{ Mbps}}$$

$$= 50\%$$

Thus, when the third link fails, the intermediate nodes 74, 76 may report the link as being 50 percent up.

In a third example, the capacities of the three sub-links 80, 82, 84 are the same as in the previous example. However, in this example the link is only reserved at 75 percent of its total capacity. In other words, the 90 Mbps of bandwidth on the link is reserved, and 30 Mbps of the bandwidth is going unused. In this example, if the third sub-link 84 fails, then the extent to which the link is up may be defined by formula (3):

$$\text{Percent up} = \frac{(20 \text{ Mbps} + 40 \text{ Mbps}) \times 100}{(90 \text{ Mbps})} \quad (3)$$

$$= \frac{6000 \text{ Mbps}}{90 \text{ Mbps}}$$

$$= 67\%$$

Thus, when the third link fails, the intermediate nodes 74, 76 may report the link as being at 67 percent of its reserved capacity.

Partial faults in packet networks may be distinguished from degraded signals in circuit networks. A degraded signal in a circuit network causes a bit error rate (BER) in a node or link. All of the signals passing through the affected node or link experience the same increase in BER. In contrast, a partial fault causes some data frames or packets to be delivered without error to the destination, while other data frames or packets are never delivered to the destination. Thus, while degraded signals cause a constant BER to be applied to all of the signals passing through the circuit network, partial faults only affect some of the packets passing through the packet network. Consequently, partial faults may be more difficult to deal with than degraded signals because the problem occurs at irregular times and does not occur in all of the packets.

Figure 6:
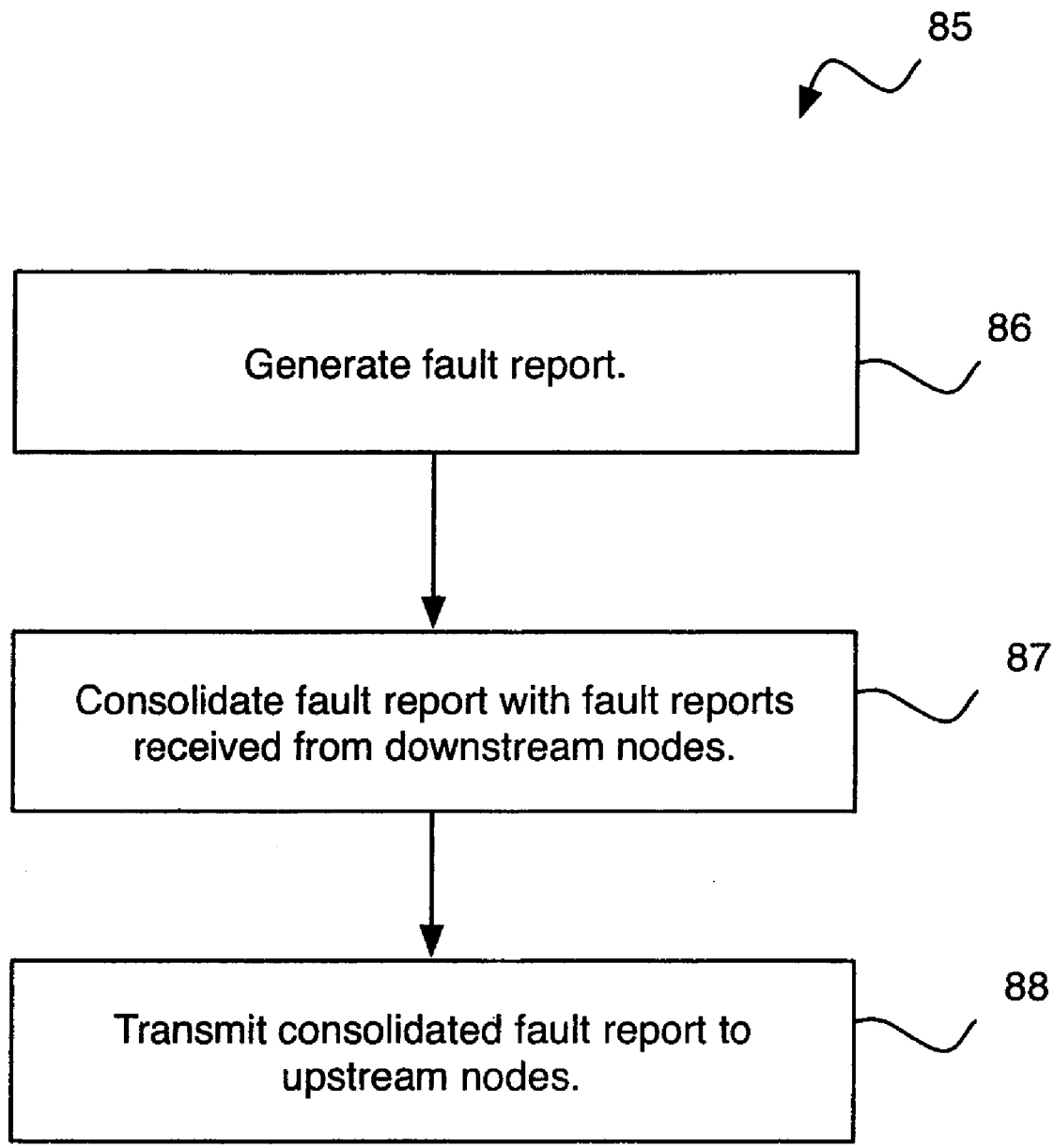
FIG. 6 is a flowchart of one embodiment of the fault propagation process.

Referring back to FIG. 4, once the faults have been identified, the faults are propagated to the upstream nodes (block 67). In an embodiment, the faults may be propagated using the process 85 illustrated in FIG. 6. Specifically, the process 85 begins by generating a fault report (block 86). In an embodiment, when the network identifies a fault, the network generates a fault report (block 86). The fault report may be any type of message or indication that there is a fault, such as a partial fault, in one of the downstream nodes or links. Alternatively, the fault report may contain an indication of a change in status of a node or link. For example, the fault report may indicate an increase in capacity, a decrease in capacity, the occurrence of a fault, or the clearing of a fault. The message may be included in the normal network traffic that flows between nodes within the network, or the message may be specifically created to report faults in the network. The message may include various pieces of information regarding the fault, including: an identification code for the node or link, the extent of the fault, the remaining capacity, the remaining reserved capacity, the expected duration of the fault, and so forth. Persons of ordinary skill in the art are aware of how to create fault reporting messages that contain such information.

In an embodiment, the process 85 continues when the network consolidates the fault report with any fault reports that have been received from any downstream nodes (block 87). More specifically, after a node creates a fault report, the node may consolidate the fault report with any other fault reports received from downstream nodes. If desired, the node may also analyze how the fault reports affects other nodes, and modify the consolidated fault report accordingly. For example, if a node receives a fault report indicating that the capacity of a downstream node is limited to 500 Mbps due to a partial fault, and the node has detected a partial fault in a working path link that limits the working path to 300 Mbps, then the link with the partial fault is more limiting than the node with the partial fault. Because the working path's capacity is most limited by the faulty link's capacity, the present node may remove or omit the faulty node's fault report from the consolidated fault report. Alternatively, it is possible that a partial fault may not impact the capacity of a working path. For example, the total path capacity may be smaller than the available path capacity after a partial fault happens. In this case, the consolidated fault report may be empty or its transmission may be blocked by the present node.

In an embodiment, the process 85 continues and the network may transmit the consolidated fault report to the upstream nodes (block 88). In an embodiment, after the consolidated fault report is complete, the node may transmit the consolidated fault report to its immediate upstream node. Each node only sends one consolidated message to its upstream node. This consolidated message is expected to be propagated all the way to the source of the path unless there is an upstream node that encounters a problem that causes the path capacity to be reduced more than the newly discovered fault. The node will not further propagate the fault report to its upstream node if the newly received fault is already covered by the previously encountered problem. Thus, the capacity is calculated by each node as the fault reports are propagated so that the source node only receives one consolidated fault report. Such a process reduces the processing at the source node and allows the network to react to changing network conditions faster than prior configurations.

The disclosed fault propagation method is more efficient than traditional fault reporting methods. Traditional fault reporting methods, such as Open Shortest Path First-Traffic Engineering (OSPF-TE), can be used for transmitting the fault reports, however they transmit the fault reports to every node within the network. For example, if a network has one hundred nodes and a fault affects ten of those nodes, OSPF-TE will broadcast the fault report to all 100 nodes. Such mass broadcasting of fault reports is inefficient because it floods each node in the network with fault reports that do not affect those nodes. The disclosed fault reporting method is more efficient because it only transmits the fault report to those nodes that are affected by the fault. Thus, the unaffected nodes can use their resources for other functions rather than dealing with fault reports that do not affect those nodes.

When the faults are received at the source node, the data streams over the working paths are reconfigured (block 68). The reconfiguration of the data streams can involve one or a plurality of the working paths and/or the protection path. In addition, the reconfiguration of the data streams can involve a partial or a full rerouting of the data from any one of the working paths to any combination of the other working paths and/or the protection path. In an embodiment, the data streams are reconfigured using a policy table. For example, the policy table may state that the data streams on the affected working paths may be rerouted proportionately onto the protection path until the protection path is at full capacity, at which time the data streams on the working paths are proportionately reduced. The reduction in the data streams does not reduce the reserved capacity for each working path, but rather reduce the workload on the working path until the fault is repaired or an alternative working path can be constructed.

When a partial failure affects multiple paths passing through a single node, the impact on each working path does not have to be proportionate. Specifically, the policy table can prioritize the working paths such that some working paths receive a greater share of the capacity than other working paths. Such prioritization may be based on the Class of Service (CoS), Quality of Service (QoS) requirements, the type of data on the working path, and other factors known to persons of ordinary skill in the art. For example, suppose a working path's capacity is reduced by fifty percent due to a partial fault and there are ten working paths passing through the node. In such a case, all ten working paths do not have to be reduced by fifty percent. Instead, some less important working paths can be reduced by more than fifty percent, while some more important working paths are reduced by less than fifty percent. Alternatively, some working paths can be maintained at full capacity, while the lesser important working paths get the remaining capacity, if any.

FIG. 2 may be used to illustrate the reconfiguration process described herein. If the network 16 experiences partial failures along the working paths 18, 22, 24, then the data streams for the working paths 18, 22, 24 can be rerouted to the protection path 26. Specifically, if the first working path 18 is limited to 70 Mbps, then 30 Mbps of data from the first working path 18 can be rerouted onto the protection path 26. Similarly, if the third working path 22 is limited to 25 Mbps, then 25 Mbps of data from the third working path 22 can be rerouted onto the protection path 26. Likewise, if the fourth working path 24 is limited to 240 Mbps, then 160 Mbps of data from the fourth working path 24 can be rerouted onto the protection path 26. Even after the reconfiguration process is complete, the protection path 26 still has capacity remaining for the second working path 20.

Figure 7:
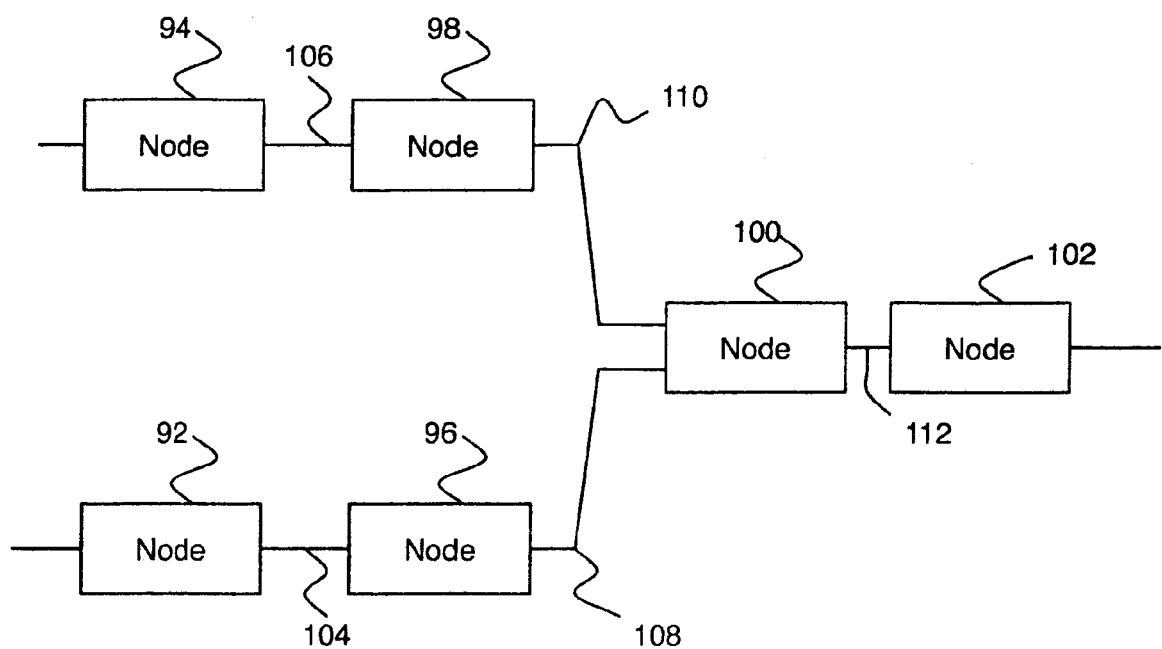
FIG. 7 is an illustration of another embodiment of a communications network.

FIG. 7 illustrates an example of the propagation process. FIG. 7 comprises two working paths: a first working path defined by nodes 94, 98, 100, and 102, and links 106, 110, and 112; as well as a second working path defined by nodes 92, 96, 100, and 102, and links 104, 108, and 112. The capacities of the working paths are limited by the capacities of the links 104, 106, 108, 110, and 112, rather than the capacities of the nodes 92, 94, 96, 98, 100, and 102. The capacities for the links 104, 106, 108, 110, and 112 are provided in Table 1:

TABLE 1

|  | Link | | | | |
| --- | --- | --- | --- | --- | --- |
|  | 104 | 106 | 108 | 110 | 112 |
| Capacity (Mbps) | 400 | 300 | 400 | 300 | 700 |

When the first and second working paths have reserved capacities, all the nodes and links traversed by the working paths have the information of the working paths' identifier and their associated capacity. Thus, each node and link that is on the first working path may be aware of the capacities of all of the other nodes and links along the working path.

When the capacity of link 112 is reduced by half due to a partial failure and link 112 is fully utilized, both the first working path and the second working path are affected. More specifically, when the partial fault is detected, the node 100 identifies the fault, generates a fault report, and transmits the consolidated fault report to nodes 96, 98. If there are no other faults in the links 104, 106, 108, 110 or nodes 96, 98, then the consolidated fault report is propagated up to nodes 92, 94. Because nodes 92, 94 are source nodes and they have received the consolidated fault report, the data streams across the two working paths may be reconfigured. Specifically, the network may consult a policy table to decide how the working paths should be reconfigured. If the policy table states that the two working paths should be proportionally reduced, then the data stream across each working path is reduced by half such that the data stream over the first working path is 150 Mbps and the data stream over the second working path is 200 Mbps. The reduced data stream on each of the two working paths reduces the data stream on link 112 to a level that is consistent with its capacity.

In a second example, the same partial fault may be detected in link 112, but with an additional partial fault detected in node 98. More specifically, node 98 may experience a partial fault that reduces its capacity to 100 Mbps. When nodes 96, 98 receive the consolidated fault report from node 100, then node 96 propagates the consolidated fault report as described above. However, node 98 will combine its fault report with the fault report received from node 100. Because the partial fault at node 98 is more limiting than the partial fault at link 112, node 98 may terminate the fault report from link 112 because node 98 already sent fault report to node 94 to reduce the capacity to 100 Mbps. Thus, when the nodes 92, 94 receive their fault reports, the fault report will indicate that the link 112 in the first working path is limited to 350 Mbps and the node 98 in the second working path is limited to 100 Mbps. In such a case, the total capacity of the two working paths is 450 Mbps, but the link 112 is limited to 350 Mbps. Assuming that the policy states that the two working paths should be proportionately reduced, a proportionate reduction in the data streams for the two working paths will result in a 30 percent reduction for each data stream. In other words, the data stream for the first working path will be reduced to 70 Mbps and the data stream for the second working path will be reduced to 280 Mbps. Such a reduction limits the data transported through link 112 to 350 Mbps.

Figure 8:
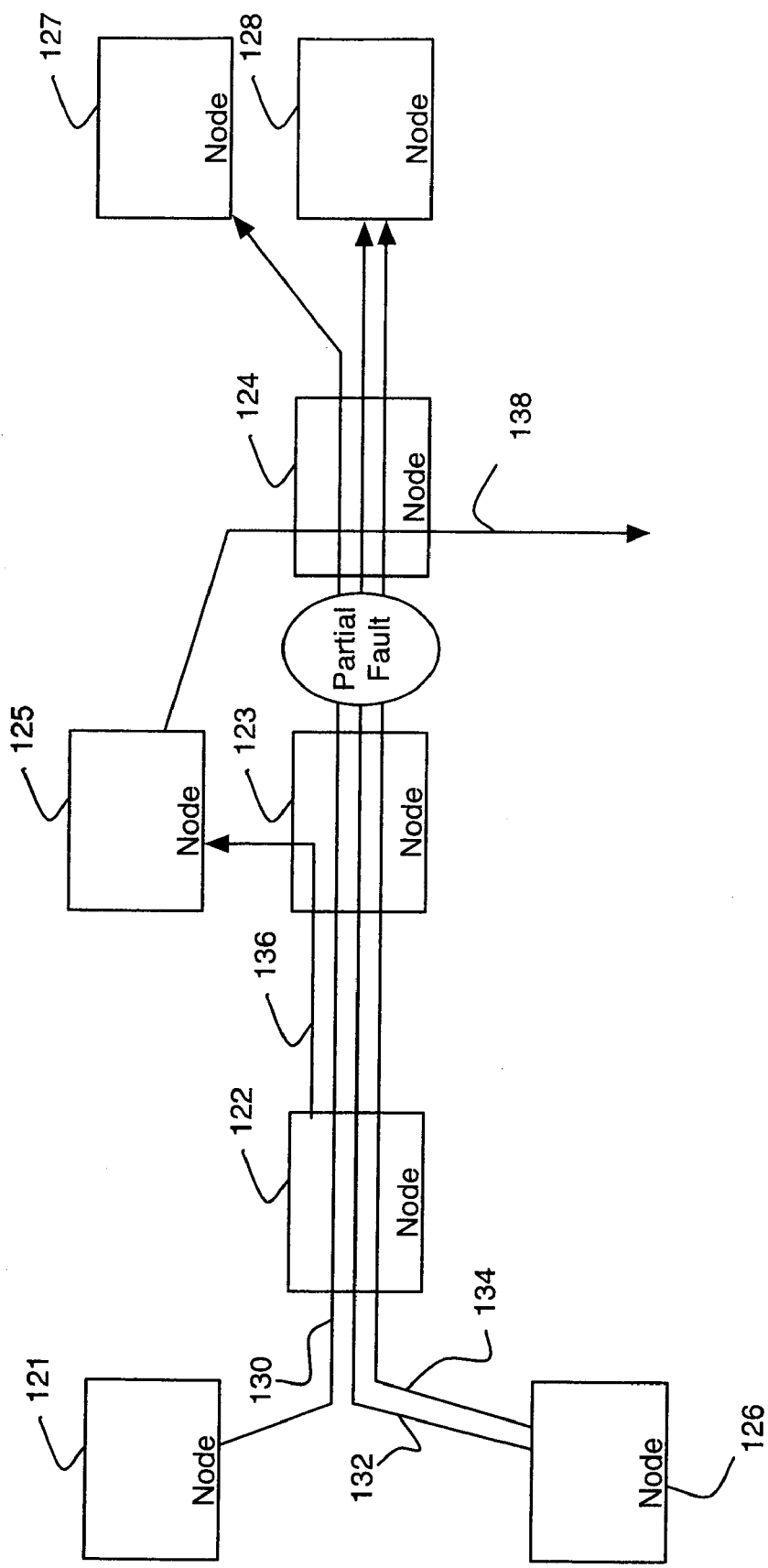
FIG. 8 is an illustration of another embodiment of a communications network.

FIG. 8 illustrates another example of the propagation process. FIG. 8 depicts eight nodes 121, 122, 123, 124, 125, 126, 127, 128 that are traversed by five paths 130, 132, 134, 136, 138. When a partial fault occurs between the nodes 123, 124, the partial fault affects paths 130, 132, 134. In such a case, node 123 can combine the fault reports for paths 130, 132, 134 and send a single combined fault report to node 122. Upon receipt of the single combined fault report, node 122 can separate the combined fault report into one fault report for path 130, which is sent to node 121, and one combined fault report for paths 132, 134, which is sent to node 126. Such an embodiment limits the number of fault messages transmitted between the various nodes 121, 122, 123, 124, 125, 126, 127, 128.

The fault reports described herein may also be used for propagating reports indicating the removal of faults. In an embodiment, the nodes will keep a record of the fault reports that were received but not propagated. When the node receives a fault clear message, the node will access the records to determine if the previously unpropagated fault report now needs to be propagated to the upstream node. If the previously unpropagated fault report now needs to be propagated to the upstream node, the fault report will be consolidated with the other fault data prior to being transmitted to the upstream node. At some point after the faults occur, the faults will be repaired, removed, or will otherwise cease to exist. When a fault is cleared at a node, the node determines whether there are any other outstanding faults from the node's downstream nodes. If there are not any outstanding faults from the downstream nodes, the node sends a fault clear message to its upstream node as part of the fault report. If there are outstanding faults from the downstream nodes, the node has to determine if the cleared fault impacts the current path capacity. If the cleared fault impacts the path capacity, a change in capacity is propagated to the upstream node as part of a fault report.

When reconfiguring the data streams, the network may maintain the order of the data packets. Specifically, if the network contains order sensitive data packets, then the network will maintain the order of the data packets. As used herein, the term "order sensitive data packets" refers to data packets that arrive at the destination in the same order that the data packets were sent by the source. The specific method by which the network maintains the order of the packets depends on the format of the network and the data. In a first example, for an Ethernet layer 2 network, the Virtual Local Area Network (VLAN) identifier can be used to switch traffic from one path to another. If there are ten VLAN streams entering a working path, then some of the VLAN streams can be rerouted when the data streams are reconfigured. The exact number of VLAN streams that are rerouted depends on the statistical packet flow over each VLAN and the percentage of traffic to be switched over. If applicable, the network may also use the data's IP prefix to switch frames with the same IP prefix to protection path. In a second example, a prefix based payload partition can be used for IP data. More specifically, based on the statistical record of the amount of traffic for each prefix and the percentage of payload to be switched over, the specific number of prefixes can be calculated. In a third example, the network may snoop the application layer's sequence number. In such an embodiment, the network may include a buffer at each of the end nodes and use sequence numbers to buffer the data streams. If the network inserts a layer of sequence numbers into each data stream when they enter the network, the destination node can reassemble the data packets or streams in the correct sequence.

In an embodiment, after the faults described herein are repaired, then the network may return to its original configuration. More specifically, the nodes keep track of the actual capacity and the configured capacity for each node within the network. Under normal conditions, the actual capacity may be equal to the configured capacity. However, when a partial fault occurs, the actual capacity could be reduced as described above. When there is a change in the capacity of any node or link within the network, such as recovery from a partial fault, the network propagates the information to all the affected nodes using the propagation process described above.

The disclosed fault propagation method is superior to other fault propagation methods. For example, one type of fault propagation once discussed by the IEEE 802.1ag drafts is limited to connectivity faults and is not useful for connection oriented paths where connectivity is maintained but the path's capacity is reduced. Specifically, partial faults affecting 90 percent of a node's capacity would not be propagated using these fault propagation systems.

Figure 9:
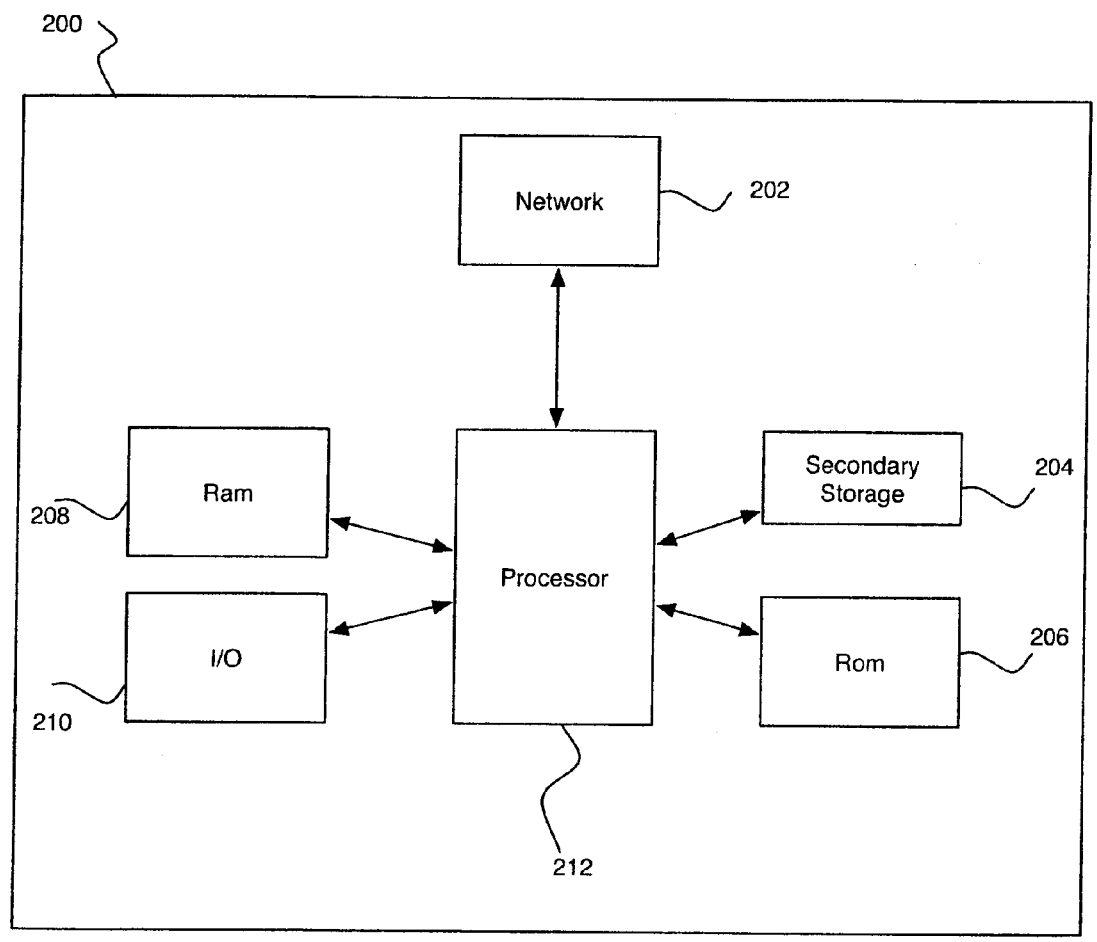
FIG. 9 is one embodiment of a general-purpose network component.

The network described above may be implemented on any general-purpose network component, such as a computer, router, switch, or bridge, with sufficient processing power, memory resources, and network throughput capability to handle the necessary workload placed upon it. FIG. 9 illustrates a typical, general-purpose network component suitable for implementing one or more embodiments of a node disclosed herein. The network component 200 includes a processor 212 (which may be referred to as a central processor unit or CPU) that is in communication with memory devices including secondary storage 204, read only memory (ROM) 206, random access memory (RAM) 208, input/output (I/O) devices 210, and network connectivity devices 202. The processor 212 may be implemented as one or more CPU chips.

The secondary storage 204 is typically comprised of one or more disk drives or tape drives and is used for non-volatile storage of data and as an over-flow data storage device if RAM 208 is not large enough to hold all working data. Secondary storage 204 may be used to store programs that are loaded into RAM 208 when such programs are selected for execution. The ROM 206 is used to store instructions and perhaps data that are read during program execution. ROM 206 is a non-volatile memory device that typically has a small memory capacity relative to the larger memory capacity of secondary storage 204. The RAM 208 is used to store volatile data and perhaps to store instructions. Access to both ROM 206 and RAM 208 is typically faster than to secondary storage 204.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A communications network comprising:
an aggregated link between a first end point and a second end point, wherein the aggregated link comprises a plurality of parallel sub-links extending from the first end point to the second end point, and wherein the aggregated link further comprises at least portions of a first working path and a second working path over which Ethernet packets are transported through the network; and
one or more network components configured to:
identify a first partial fault along the aggregated link, wherein the first partial fault comprises a decrease in a capacity of the aggregated link, and wherein the decreased capacity of the aggregated link is greater than zero;
determine that an aggregated data rate exceeds the decreased capacity of the aggregated link, wherein the aggregated data rate comprises a first data rate and a second data rate corresponding to the first working path and the second working path, respectively;
generate a first fault report that specifies a first reduction, wherein the first reduction proportionally decreases the first data rate and the second data rate on a percentage basis such that the aggregated data rate no longer exceeds the decreased capacity of the aggregated link subsequent to the first reduction; and
transmit the first fault report to a first node associated with the first working path and a second node associated with the second working path.

2. The communications network of claim 1, wherein the first fault is identified by a network device, and wherein in identifying the first partial fault, the network device is configured to:
determine a packet drop rate along the aggregated link; and
indicate the first partial fault when the packet drop rate exceeds a threshold value.

3. The communications network of claim 1, wherein the first partial fault occurs when at least one, but not all, of the plurality of sub-links fails.

4. The communications network of claim 1, wherein the first node is positioned downstreadam of the first partial fault.

5. The communications network of claim 1, wherein the one or more network components are further configured to:
determine whether the first partial fault affects a reserved connection on one of the sub-links; and
responsive to the determination that the first partial fault does not affect the reserved connection, not transmitting the first fault report to any upstream nodes associated with the reserved connection that are not also associated with an affected working path.

6. The communications network of claim 1, wherein the first partial fault in the aggregated link is attributable to a failure in a sub-link.

7. The communications network of claim 1, wherein the one or more network components are further configured to:
determine that the aggregated data rate exceeds the decreased capacity of the aggregated link, and
generate, or promote the generation of, the first fault report.

8. The communications network of claim 1, wherein the one or more network components are further configured to:
consolidate the first fault report with at least a second fault report that specifies a second reduction associated with a second partial fault, wherein the second reduction is less than or equal to the first reduction, and wherein the second fault report is omitted during consolidation.

9. The communications network of claim 8, wherein the second partial fault is independent from the first partial fault such that the decreased capacity of the aggregated link attributable to the first partial fault is not cumulative with a second decreased capacity attributable to the second partial fault.

10. The communications network of claim 1, wherein the aggregated link further comprises a protection path, and wherein at least some of the Ethernet packets from the first working path, the second working path, or both are transferred on the protection path subsequent to the first partial fault.

11. The communications network of claim 10, wherein an order of any order-specific Ethernet packets transported through the aggregated link is maintained when at least some of the Ethernet packets are transferred to the protection path.

12. The communications network of claim 10, wherein a capacity of the protection path is not equal to the sum of capacities of the working paths.

13. The communications network of claim 10, wherein less than all of the Ethernet packets are transferred from the first working path to the protection path.

14. The communications network of claim 10, wherein identifying the first partial fault comprises analyzing a packet drop rate across the aggregated link.

15. The communications network of claim 1, wherein the first end point is coupled to the first node such that the first end point is positioned between the first node and the second end point, wherein the first end point is further coupled to the second node such that the first end point is positioned between the second node and the second end point, wherein the first working path branches from the first node to the second end point via the first end point, and wherein the second working path branches from the second node to the second end point via the first end point.

16. The communications network of claim 1, wherein the first node is positioned upstream of the first partial fault.

17. The communications network of claim 16, wherein the first node is configured to:
responsive to receiving the first fault report, reconfigure the first data rate based on the first reduction;
receive a fault clear message subsequent to reconfiguring the first data rate based on the first reduction; and
responsive to receiving the fault clear message, reconfigure the first data rate based on the fault clear message.

18. The communications network of claim 17, wherein reconfiguring the first data rate based on the first reduction comprises maintaining a throughput for a higher priority traffic while reducing a throughput for a lower priority traffic.

19. The communications network of claim 18, wherein the first partial fault occurs when a current capacity of a component is less than a normal capacity of the component.

20. The communications network of claim 19, wherein the first fault report comprises at least one of: an indicator of a change in capacity along the aggregated link, an identification of the location of the first partial fault, a remaining capacity of the aggregated link, and a remaining reserve capacity of the aggregated link.

21. The communications network of claim 20, wherein the first fault report is transmitted in normal network traffic.

22. The communications network of claim 20, wherein the first fault report is transmitted in a specific failure report message.

* * * * *